United States Patent

Varshneya et al.

[11] 4,199,704
[45] Apr. 22, 1980

[54] ALUMINA, CALCIA, BARIA, STRONTIA SEALING COMPOSITION AND ARTICLE OF MANUFACTURE

[75] Inventors: Arun K. Varshneya, Chesterland; William L. Taylor, East Cleveland, both of Ohio

[73] Assignee: General Electric Company, Schenectady, N.Y.

[21] Appl. No.: 20,619

[22] Filed: Mar. 15, 1979

[51] Int. Cl.² .................... C03C 3/00; C03C 3/30; H01J 17/18; H01J 61/36
[52] U.S. Cl. .................. 313/221; 106/47 R; 428/432; 428/433; 428/472
[58] Field of Search ............. 106/47 R; 313/220, 221, 313/317; 428/472, 433, 432

[56] References Cited

U.S. PATENT DOCUMENTS

| | | | |
|---|---|---|---|
| 3,441,421 | 4/1969 | Sarver et al. | 106/73.4 |
| 3,469,729 | 9/1969 | Grekila et al. | 106/47 R |
| 3,480,823 | 11/1969 | Chen | 313/221 |
| 3,588,577 | 6/1971 | McVey et al. | 313/317 |
| 3,852,079 | 12/1974 | Davis | 106/47 R |

*Primary Examiner*—O. R. Vertiz
*Assistant Examiner*—Mark Bell
*Attorney, Agent, or Firm*—Ernest W. Legree; Lawrence R. Kempton; Philip L. Schlamp

[57] ABSTRACT

An improved sealing composition for use between alumina ceramic parts, or between alumina ceramic and refractory metal, is based on 40 wt% $Al_2O_3$, 35 wt% CaO, 15 wt% BaO and 10 wt% SrO, and has an average thermal expansion coefficient of $95 \times 10^{-7}/°C$. between 25° C. and 600° C. This composition after sealing achieves a closer match to the coefficient of thermal expansion of high density polycrystalline alumina ($86 \times 10^{-7}/°C$.) than previously available materials. In addition, it has a wider sealing range which facilitates seal processing.

9 Claims, 1 Drawing Figure

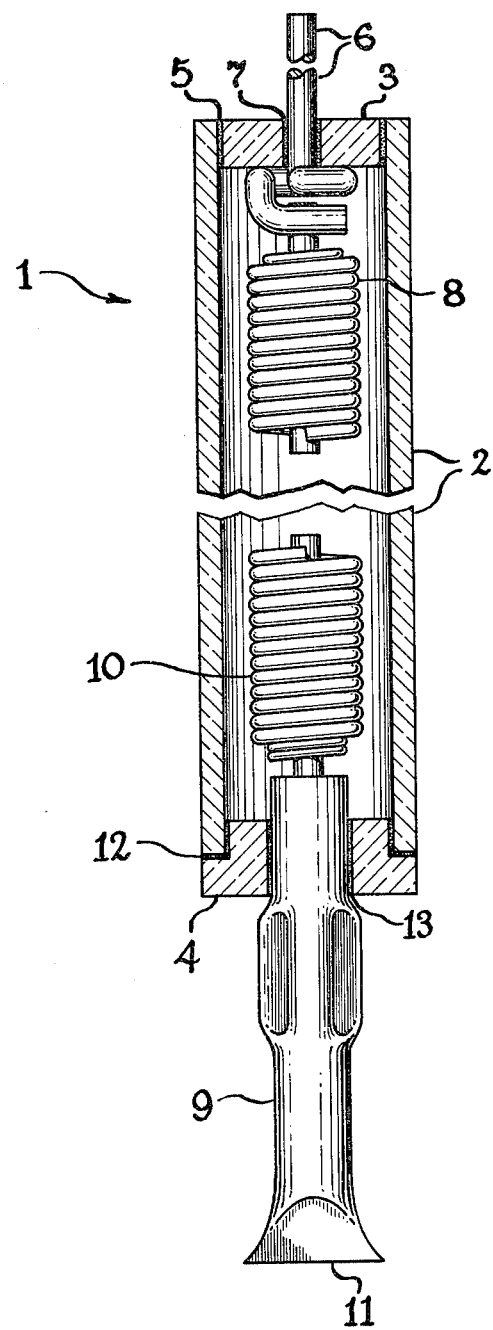

ALUMINA, CALCIA, BARIA, STRONTIA SEALING COMPOSITION AND ARTICLE OF MANUFACTURE

The invention relates to a glassy sealing composition used for bonding to alumina ceramic, that is, bonding ceramic to ceramic or ceramic to metal in electric lamp manufacture.

BACKGROUND OF THE INVENTION

Alumina ceramic, either translucent or clear, is particularly suitable as an envelope material for high intensity alkali metal vapor lamps such as high pressure sodium vapor lamps, because it withstands the attack of the vapors of the alkali metals even at high temperatures. In making such lamps, end closures which support the electrodes must be bonded and hermetically sealed to a ceramic tube, and for this purpose a sealing glass or composition is commonly used. The closures may take the form of metal end caps which provide direct electrical connections to the electrodes. More recently ceramic plugs have been used for the closures because they are cheaper, and in such case a metal conductor must be sealed through the plug to provide the electrical connection. The metal having a coefficient of expansion closest to that of alumina ceramic is niobium, and it is the one generally used either for the end cap, or for the inlead in the case of a ceramic plug Compositions commonly used for sealing high pressure sodium vapor lamps lie in the $Al_2O_3$-CaO-BaO system, typical ranges being 35–60 wt% $Al_2O_3$, 30–60 wt% CaO, and 5–20 wt% BaO. Desirable properties of a sealing compositions are a thermal expansion closely matching that of the alumina ceramic having an average thermal expansion coefficient $\alpha$ of $86 \times 10^{-7}/°C.$, a favorable liquidus temperature, that is one above the highest temperature to be encountered during operation of the lamp, wide sealing range, ability to form glasses when melted and cooled rapidly, and stability in the presence of alkali metal vapors at elevated temperatures. A composition meeting the foregoing requirements is disclosed in U.S. Pat. No. 3,588,577—McVey et al. It is centered on 45 wt% $Al_2O_3$, 36 wt% CaO, 14 wt% BaO, and 5 wt% MgO, and, in the glassy form, has an average thermal expansion coefficient $\alpha$ of $88 \times 10^{-7}/°C.$ between 25° C. and 600° C. This composition, referred to as G45, has been widely used by applicants' assignee in the commercial manufacture of high pressure sodium vapor lamps of the kind using niobium metal end caps. An improved composition disclosed in application Ser. No. 851,439 of McVey and Datta, filed Nov. 14, 1977 and similarly assigned is centered on 47 wt% $Al_2O_3$, 37 wt% CaO and 16 wt% BaO, and has an average thermal expansion coefficient $\alpha$ of $89 \times 10^{-7}/°C.$ This composition, referred to as G47, has more recently been used by applicants' assignee in the commercial manufacture of high pressure sodium vapor lamps of the kind using ceramic end plugs. However even when using the improved G47 sealing composition, some defective products in the form of cracked or leaky seals are produced in manufacture. Such defective products must be rejected and the proportion thereof is commonly referred to as the shrinkage rate.

The object of the invention is to provide a new composition for sealing to alumina ceramic, that is for sealing either metal or ceramic to alumina ceramic, which is superior to known compositions. In particular, a composition is desired providing a lower shrinkage rate when sealing ceramic plugs into the ends of alumina ceramic tubes in electric lamp manufacture.

SUMMARY OF THE INVENTION

In accordance with the invention we provide an improved sealing glass or composition for use between alumina ceramic parts and which may also be used between alumina ceramic and refractory metals or other ceramics. It lies in the system $Al_2O_3$-CaO-BaO-SrO with the proportion of the individual oxides falling within these ranges:

$Al_2O_3$—35 to 45 wt%,
CaO—25 to 40 wt%,
BaO—5 to 20 wt%,
SrO—8 to 30 wt%.

Mixtures within the foregoing ranges formed good glasses which could be melted with little difficulty. Their average thermal expansion coefficient over the temperature range form 25° C. to 600° C. ranged from $90 \times 10^{-7}/°C.$ to $100 \times 10^{-7}/°C.$ They have the following advantages:

(1) The thermal expansion of the sealant after sealing is closer to that of the alumina ceramic than that of known sealants and this means less tendency to cracking.

(2) The disparity between the thermal expansions of various phases within the sealant after sealing is less and this reduces the tendency towards formation of microcracks.

(3) The sensitivity of sealing to the heat treatment schedule is reduced.

A preferred composition consists of 40 wt% $Al_2O_3$, 35 wt% CaO, 15 wt% BaO and 10 wt% SrO.

DESCRIPTION OF DRAWING

The single FIGURE of the drawing shows an alumina ceramic arc tube, sectioned to reveal the use of the sealing composition of the invention.

DESCRIPTION OF PREFERRED EMBODIMENT

A typical application of the sealing composition of the invention to seal the arc tube closures for an electric lamp is illustrated in FIG. 1. The arc tube 1 comprises an envelope 2 of ceramic tubing consisting of sintered high density polycrystalline alumina. A central portion of the tube has been cut out to shorten the figure, and the sectioning reveals the internal construction. By way of example, in a 400-watt size of lamp, the arc tube is about 110 mm long $\times$ 7.5 mm in diameter.

The ends of the tube are closed by alumina ceramic plugs, a flat disc-like plug 3 at the upper end and a shouldered plug 4 at the lower end. Plug 3 is hermetically sealed into the end of the arc tube by a ring 5 of sealing composition in which our invention is embodied. The plug is centrally perforated and a niobium inlead wire 6 extending through the hole is hermetically sealed by more of the sealing composition indicated at 7. The inlead supports the upper electrode 8 within the arc tube and its external portion is used as a connector and also to support the upper end of the arc tube within an outer envelope. the details of this seal may be as more fully described in U.S. Pat. No. 3,992,642—McVey and Kelling.

Shouldered plug 4 (sometimes referred to as a 'manhole' plug) at the lower end has a central aperture through which extends a thin-walled niobium tube 9 which serves as an inlead and supports lower electrode 10 within the arc tube. Tube 9 also serves as an exhaust tube for removing air and introducing the filling gas and the sodium and mercury charge during manufacture, after which it is hermetically tipped off at 11. The construction of the lower plug and electrode assembly may be as more fully described in U.S. Pat. No. 4,065,691—McVey. The sealing composition of our invention is used at 12 to hermetically seal lower plug 4 to the arc tube, and at 13 to seal niobium tube 9 to the plug.

Thermal Expansion Mismatch

We have confirmed that the problems associated with sealing alumina ceramic parts arise primarily from thermal expansion mismatch between the ceramic and the sealing composition. We have found that the problem is compounded by an expansion mismatch that varies with the sealing schedule. Such variation in mismatch is ascribed to variation in the degree of crystallinity, which in turn depends upon the extent to which $Al_2O_3$ from the alumina ceramic is dissolved into the sealing composition during sealing. In order to reduce such variations, it has generally been preferred to have the sealing composition vitrify and remain vitreous throughout the sealing operation. Our observations of common modes of failure in the alumina ceramic envelopes of high pressure sodium vapor lamps indicate that both the G45 and G47 sealing compositions previously mentioned end up having too low an expansion coefficient after final sealing. The starting point of our invention is our surmise, predicated on the preceding observations, that the shrinkage rate would be reduced further if the starting composition, that is the composition prior to sealing, had a thermal expansion coefficient not only higher than that of G45, but higher even than that of the G47 composition.

It was already known that large amounts of CaO in the sealing composition lead to rapid devitrification and in particular may make it quite difficult to avoid precipitation of the phase $12 CaO.7Al_2O_3$. McVey and Datta in their aforementioned copending application desire to avoid this phase which they describe as thermally incompatible. The success of their G47 composition may be ascribed at least in part to its greater viscosity and resultant slower action in dissolving $Al_2O_3$ from the alumina ceramic or in crystallizing upon cooling.

We have approached the problem from a different aspect by considering the probable effect of each component on the thermal expansion of the glassy composition after sealing, sometimes referred to as the additive factor property of the constituents. In the $Al_2O_3$-CaO-BaO-MgO system, CaO is the chief contributing species to high expansion while MgO and $Al_2O_3$ are the least. If one were to attempt to raise the thermal expansion coefficient by increasing the proportion of CaO, the likelihood of precipitation of the undesirable $12CaO.7Al_2O_3$ phase would increase and this is clearly undesirable. Additions of BaO are also undesirable because BaO tends to impede vitrification and to promote crystallization as the melted mass cools. Our invention resolves as the melted mass cools. Our invention resolves this dilemma by removing suitable portions of $Al_2O_3$, CaO, BaO, and MgO and replacing them by SrO to which we ascribe a thermal expansion factor intermediate those of CaO and BaO. We have reasoned further that by increasing the number of components, the likelihood of phase separation will be decreased as a result of a healthy competition between possible crystallizing species such as $12CaO.7Al_2O_3$ and $12SrO.7Al_2O_3$.

Experimental Verification

To this end, we have tested many compositions in the system $Al_2O_3$-CaO-BaO-SrO. The wt% ranges for the individual oxides were 35 to 45% $Al_2O_3$, 25 to 40% CaO, 5 to 20% BaO, and 8 to 30% SrO. We have also tested small additions of other oxides: namely 0 to 2% $TiO_2$, 0 to 2% $ZrO_2$ and 0 to 4% $B_2O_3$. We found that good glasses could be melted in this range with little difficulty and had $\alpha$ values ranging from $90 \times 10^{-7}/°C$ to $100 \times 10^{-7}/°C$. Small additions of $B_2O_3$ in particular improved the wetting characteristics.

Preferred Composition, Preparation and Characterization

A preferred composition within the foregoing range consisting of 40 wt% of $Al_2O_3$, 35 wt% CaO, 15 wt% BaO and 10 wt% SrO was extensively tested. It may be prepared by melting an appropriate batch mixture consisting of $Al_2O_3$, $CaCO_3$, $BaCO_3$, and $SrCO_3$ at 1450° C. After crushing the mass so obtained, 5% organic binder was added according to the conventional ceramic processing techniques, and suitably sized washers were pressed.

Lamp seals were made using a single sealing washer according to conventional procedure with both 400 watt and 150 watt tube sizes. The inlead, electrode, and ceramic plug assembly with a washer of the sealing composition placed over the plug is supported in the open end of arc tube 2. The whole assembly is then fired in high vacuum to a temperature sufficient to soften the sealing composition, about 1500° C. The sealing fluid spreads out in a peripheral sealing ring 5 between the alumina tube and the plug, and also into the aperture through the plug as indicated at 7 to seal the inlead therein. Vacuum tests of seals made in this manner and accelerated life testing in a factory test indicate that they are satisfactory. Enhanced stress tests showed a much lower shrinkage rate for seals made using the SrO-containing composition of our invention than for seals using either the G45 or the G47 composition. This indicates that matching of thermal coefficients of expansion as between the ceramic and the sealing composition has been accomplished to a higher degree than heretofore with prior art sealing compositions.

We have also found that our new sealing composition reduces the sensitivity of sealing to the heat treatment schedule. We believe that this is due to the reduced probability of $12 Cao.7Al_2O_3$ precipitation and concomitantly to the lesser effect of $12 SrO.7Al_2O_3$ on devitrification.

What we claim as new and desire to secure by Letters Patent of the United States is:

1. A sealing composition for use in bonding to alumina ceramic, said composition consisting essentially of the following constituent oxides within the indicated proportions by weight:

$Al_2O_3$: 35 to 45%
CaO: 25 to 40%
BaO: 5 to 20%
SrO: 8 to 30% and not over 4% in all of one or more of the following oxides for improving the wetting and flow characteristics: $B_2O_3$, MgO, $SiO_2$, $TiO_2$ and $ZrO_2$.

2. A sealing composition as in claim 1 wherein the proportions of the constituents have been selected to achieve in the glassy state of the composition over the temperature range from 25° C. to 600° C. an average thermal expansion coefficient between $90 \times 10^{-7}$/°C. and $100 \times 10^{-7}$/°C.

3. A sealing composition as in claim 1 wherein the proportions by weight are as follows: $Al_2O_3$ 40%, CaO 35%, BaO 15% and SrO 10%.

4. An article of manufacture comprising an alumina ceramic body having a part of ceramic or refractory metal bonded thereto by a sealant, said sealant being the end product of melting and congealing in place a composition consisting essentially of the following constituent oxides within the indicated proportions by weight:

$Al_2O_3$: 35 to 45%
CaO: 25 to 40%
BaO: 5 to 20%
SrO: 8 to 30% and not over 4% in all of one or more of the following oxides: $B_2O_3$, MgO, $SiO_2$, $TiO_2$ and $ZrO_2$.

5. An article of manufacture as in claim 4 wherein the proportions of the constituents of the sealing composition have been selected to achieve in the glassy state of the composition over the temperature range from 25° C. to 600° C. an average thermal expansion coefficient between $90 \times 10^{-7}$/°C. and $100 \times 10^{-7}$/°C.

6. An article of manufacture as in claim 4 wherein the proportions by weight are as follows: $Al_2O_3$ 40%, CaO 35%, BaO 15% and SrO 10%.

7. A sealed electric lamp comprising an envelope formed of an alumina ceramic tube having end closures, a pair of electrodes and a filling of an ionizable medium therein, and a sealant bonding at least one end closure to said tube, wherein the improvement resides in said sealant being the end product of melting and congealing in place a composition consisting essentially of the following constituent oxides within the indicated proportions by weight:

$Al_2O_3$: 35 to 45%
CaO: 25 to 40%
BaO: 5 to 20%
SrO: 8 to 30% and not over 4% in all of one or more of the following oxides: $B_2O_3$, MgO, $SiO_2$, $TiO_2$ and $ZrO_2$.

8. A sealed electric lamp as in claim 7 wherein the proportions of the constituents of the sealing composition have been selected to achieve in the glassy state of the composition over the temperature range from 25° C. to 600° C. an average thermal expansion coefficient between $90 \times 10^{-7}$/°C. and $100 \times 10^{-7}$/°C.

9. A sealed electric lamp as in claim 7 wherein the proportions by weight are as follows: $Al_2O_3$ 40%, CaO 35%, BaO 35% and SrO 10%.

* * * * *